United States Patent [19]

Cloney et al.

[11] Patent Number: 5,692,572
[45] Date of Patent: Dec. 2, 1997

[54] LAWN EDGER

[75] Inventors: John Edward Cloney, Mt. Albert; Brian Steven Johnston, Mangere, both of New Zealand

[73] Assignees: B. S. Johnston; R. J. Johnston; W. H. Johnston; D. R. Johnston, all of Auckland, New Zealand

[21] Appl. No.: 498,298

[22] Filed: Jul. 3, 1995

[30] Foreign Application Priority Data

Jul. 4, 1994 [NZ] New Zealand ............... 260924

[51] Int. Cl.⁶ .................................. A01G 3/06
[52] U.S. Cl. ............................. 172/15; 172/13
[58] Field of Search ............... 172/13, 14, 15; 56/16.9

[56] References Cited

U.S. PATENT DOCUMENTS

| | | | |
|---|---|---|---|
| 1,654,574 | 1/1928 | Brown | 172/15 X |
| 2,483,935 | 10/1949 | Ridenour | 172/14 X |
| 2,630,747 | 3/1953 | Mintz | 172/14 X |
| 2,634,667 | 4/1953 | Woolwine | 172/15 |
| 2,673,396 | 3/1954 | Beres | 172/15 X |
| 2,682,825 | 7/1954 | Warholoski | 172/14 |
| 3,231,024 | 1/1966 | Lazich | 172/14 |
| 3,322,201 | 5/1967 | Ballister | 172/14 |
| 3,907,039 | 9/1975 | Remley et al. | 172/15 |
| 4,200,155 | 4/1980 | Mullet et al. | 172/14 |
| 4,629,006 | 12/1986 | Mullet et al. | 172/15 |
| 4,691,784 | 9/1987 | Mullet et al. | 172/15 |
| 4,930,580 | 6/1990 | Fuss et al. | 172/15 |

*Primary Examiner*—Terry Lee Melius
*Assistant Examiner*—Christopher J. Novosad
*Attorney, Agent, or Firm*—Christensen O'Connor Johnson & Kindness PLLC

[57] ABSTRACT

This invention relates to a grass cutting apparatus using a generally disk-shaped cutter which is bias against the edge against which it is cutting while allowing some vertical and lateral movement of the cutting disk. The preferred embodiments relate to such a cutting disk provided as an attachment to such additional apparatus such as a motor mower and seeks to decrease the accuracy with which an operator must attempt to keep the mower from the border between the grass and the concrete or similar such material forming a border.

6 Claims, 3 Drawing Sheets

LAWN EDGER

BACKGROUND

(1) Field of the Invention

This invention relates to grass cutting apparatus and, in particular, for cutting grass edges against pathways or other borders.

(2) Description of the Prior Art

Conventional grass cutting apparatus for cutting the edges of grass areas such as lawns and the like are often provided in conjunction with mowers. They may comprise a cutting blade adjacent an end of an arm and the cutting blade itself is traditionally provided as a disk like blade to act between the border of concrete or similar such material and the lawn itself. During operation of such conventional apparatus, the blade is often fixed in its relationship on a vertical plane with respect to the mower itself. Therefore, the blade is unable to account for variations in the terrain and is unable to apply an even pressure to the cutting blade. In some circumstances, the blade may lift the adjacent wheels of the mower off the ground.

Furthermore, actuation of such a cutting blade from an out of use position to an in use position is often provided by a lever acting through a ratchet mechanism which, although allowing some manual variation in the height at which the blade is fixed, provides an apparatus which is slow to operate and requires constant manual adjustment.

Alternative hydraulically operated mechanism are expensive and also do not always allow sufficient variation in the vertical displacement of the blade to apply an even pressure to the cut.

Also, the cutting blade in the form of a disk is generally angled from a vertical orientation to try and apply the blade against the concrete to increase the cutting pressure. This is not always desirable or easy to achieve.

OBJECT OF THE INVENTION

Therefore, it is an object of the present invention to provide a grass cutting apparatus for the cutting of grass against borders which overcomes some of the disadvantages of the prior art and/or at least provides the public with a useful choice.

SUMMARY OF THE INVENTION

Accordingly, in a first aspect, the invention consists in a grass cutting apparatus for the cutting of grass against borders comprising:

a main body portion;

a support arm pivotally mounted to said main body portion;

a cutting blade connected to said support arm; and biasing means acting on said support arm to bias said arm and apply pressure to said arm when in an in use position and allow some vertical displacement of said support arm and cutting blade while in use; and a pivotally mounted lever connected by a linkage to said main body portion and operable to move said support arm between said in-use position and an out-of-use position, said biasing means also acting on said linkage to hold said support arm in both said in-use and said out-of-use positions.

Accordingly, in a second aspect, the invention consists in a grass cutting apparatus for the cutting of grass against a border comprising:

a cutting disk which, in use, acts between said border and said grass to cut said grass away from said border;

a disk support bracket providing an axle for the mounting of said cutting disk substantially through a central axis through said disk;

a support arm to which said disk support bracket is pivotally connected about an axis substantially transverse to the axial mounting of said disk; and wherein said cutting edge of said disk is on a plane substantially parallel although distil from a plane passing through said axis of said pivotal connection between said disk support bracket and said support arm.

BRIEF DESCRIPTION OF THE DRAWINGS

Other aspects of the invention will become apparent to those skilled in the art to which the invention relates upon reading of the description of the preferred embodiments as set out below with reference to the following drawings in which.

DETAILED DESCRIPTION OF THE PREFERRED EMBODIMENTS

Figure 1:
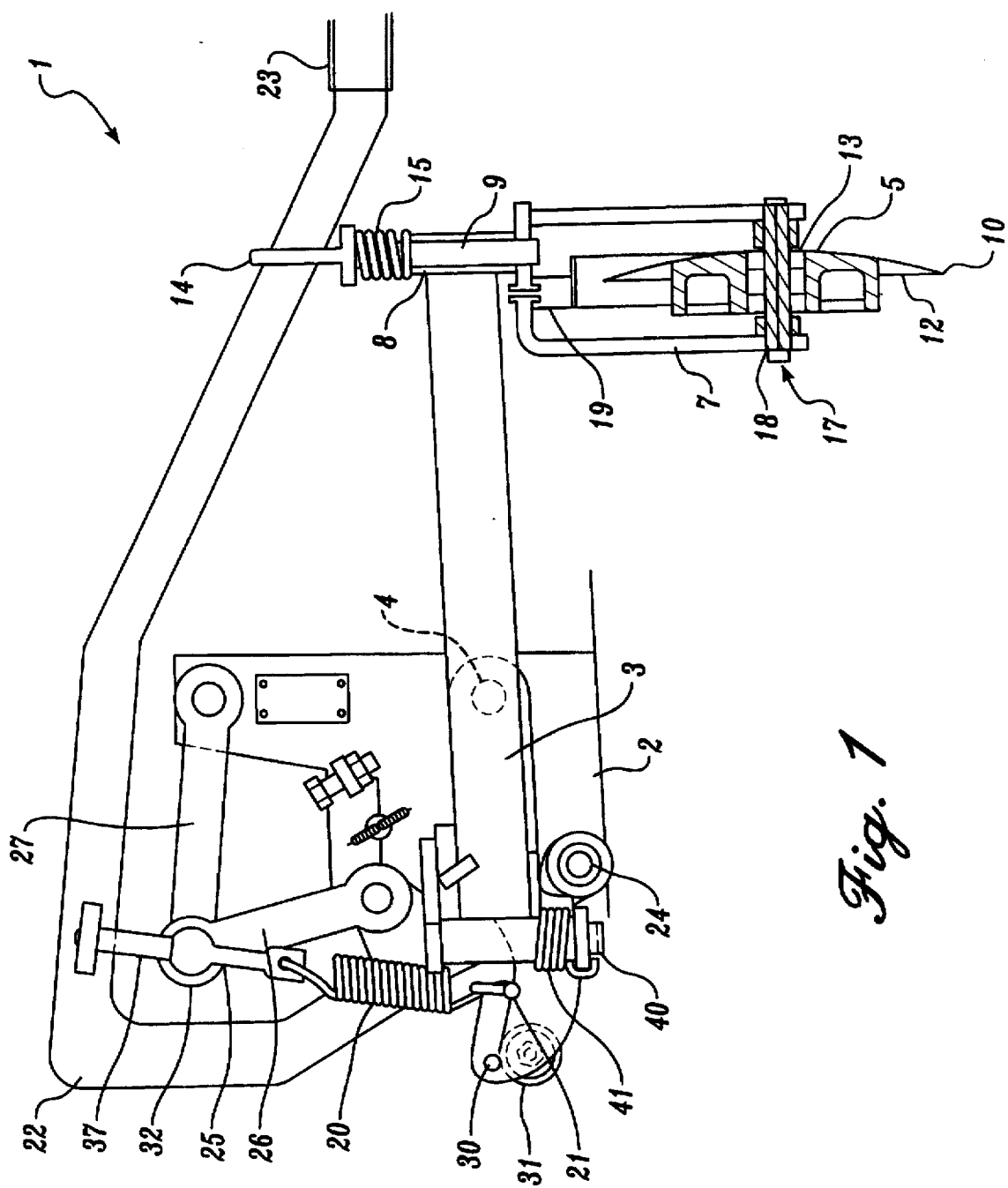
FIG. 1 shows an elevational view of one embodiment of the invention.

Referring to the drawings, the invention comprises a grass cutting apparatus for the cutting of grass against borders B such as pathways, mowing strips and the like.

Although the apparatus 1 may be provided as an entirely separate piece of apparatus carried on a frame or main body portion 2 of any particular shape or type, it is more usual for the apparatus 1 to be fitted as an extra attachment to conventional mowing apparatus and particularly a ride-on mower for use on larger grass areas.

Such fitment usually comprises the fitment of the apparatus 1 on the side of such mowing apparatus so that the grass cutter for cutting the borders B may be used while the mower is driven along either the grass or concrete or other material forming the border B adjacent the interface between the grass and the border B. The cutting blade can then be run between the two materials at the interface to cut grass away from the edge.

The apparatus 1 itself comprises the main body portion 2 carrying a support arm pivotally connected at 4 to the main body portion 2. This pivotal connection is shown as being provided on a substantially horizontal axis.

The support arm 3 carries the cutting blade 5 adjacent one end 8 of the support arm 3. There is no particular necessity for the blade 5 to be carried adjacent the end 8 of the support arm 3 although clearly this is preferable.

The connection between the support arm 3 and the blade 5 comprises a support bracket 7 pivotally mounted about an axis 9 being an axis 9 substantially parallel to the plane on which the cutting edge 10 of the disk 5 resides. As shown, this axis 9 is substantially vertical as is the plane in which the cutting edge 10 is provided.

The mounting of the disk 5 about the axis 9 allows the blade 5 to be rotated throughout a full 360° in its connection with the support arm 3. In this preferred form with a cutting disk 5 provided having a concave side 12 and a convex side 13, it is desirable to use the blade 5 so that the concave face 12 is run against the border B as opposed to the grass area. The provision of the cutting blade 5 about the vertical axis 9 allows such a blade to be used with the apparatus to which it is attached to run on either the grass or the material forming the border B such as the concrete pathway or the like with only a simple rotation of the blade 5 about the axis 9 of 180° to re-orientate the mechanism to run on the opposed side of the interface between the grass and the border B.

To facilitate the rotation of the disk 5 to suit the alternative orientation, a handle 14 may be provided in connection with the support bracket 7 axially mounting the disk 5 through axial 17 so that rotation of the handle 14 corresponds to rotation of the disk 5 about the pivot axis 9. In addition, a compression spring 15 may be provided to provide some resistance to rotation about the axis 9.

It should be noted that the mounting of the disk 5 on the substantially central axis 17 through the disk 5 is such that the cutting edge 10 is on a parallel plane although distil from the pivot axis 9 which mounts the apparatus to the support arm 3. This can be accommodated by varying the number of spacers 18 provided either side of the disk 5 on its mounting to the axle 17.

This offset of the disk 5 from its line of mounting will, in use, tend to cause the disk 5 to rotate about the axis 9 so that a leading edge of the disk 5 is rotated towards the concave side 12 of the disk 5. This action assists in ensuring that the leading cutting edge of the disk 5 maintains some pressure against the border B adjacent which the concave side 12 of the disk 5 will sit.

Furthermore, the quantity of pressure applied by the disk 5 through this tendency to turn towards the border B can be increased or decreased by increasing or decreasing the offset of the plane of the cutting edge 10 from the pivot axis 9.

A guard 19 may be provided around the upper portions of the cutting disk 5 for safety.

Returning to the mechanism connected to the support arm 13, the support arm 3 is biased to apply some pressure towards the border B or grass verge on which it runs. As shown in this preferred embodiment, this biasing may be provided by a biasing means being a tension spring 20 connected to the support arm 3 at a connection point 21 on an opposed side of the support arm about the mounting pivot 4 from the cutting disk 5. This tension spring 20 applies an upward pressure to the support arm 3 at connection point 21 to apply a downward pressure to the cutting disk 5 in its operation.

It is desirable for equipment of this type to be able to achieve both an in use or first position and an out of use or second position. This allows the apparatus to be entirely withdrawn from any contact with the ground when the remainder of the apparatus such as a mower is used for its conventional purposes.

To achieve this, this preferred form provides an actuating means being a lever 22 having a handle 23 for manual operation of the level 22 about a pivot 24 to the main body 2.

Figure 4:
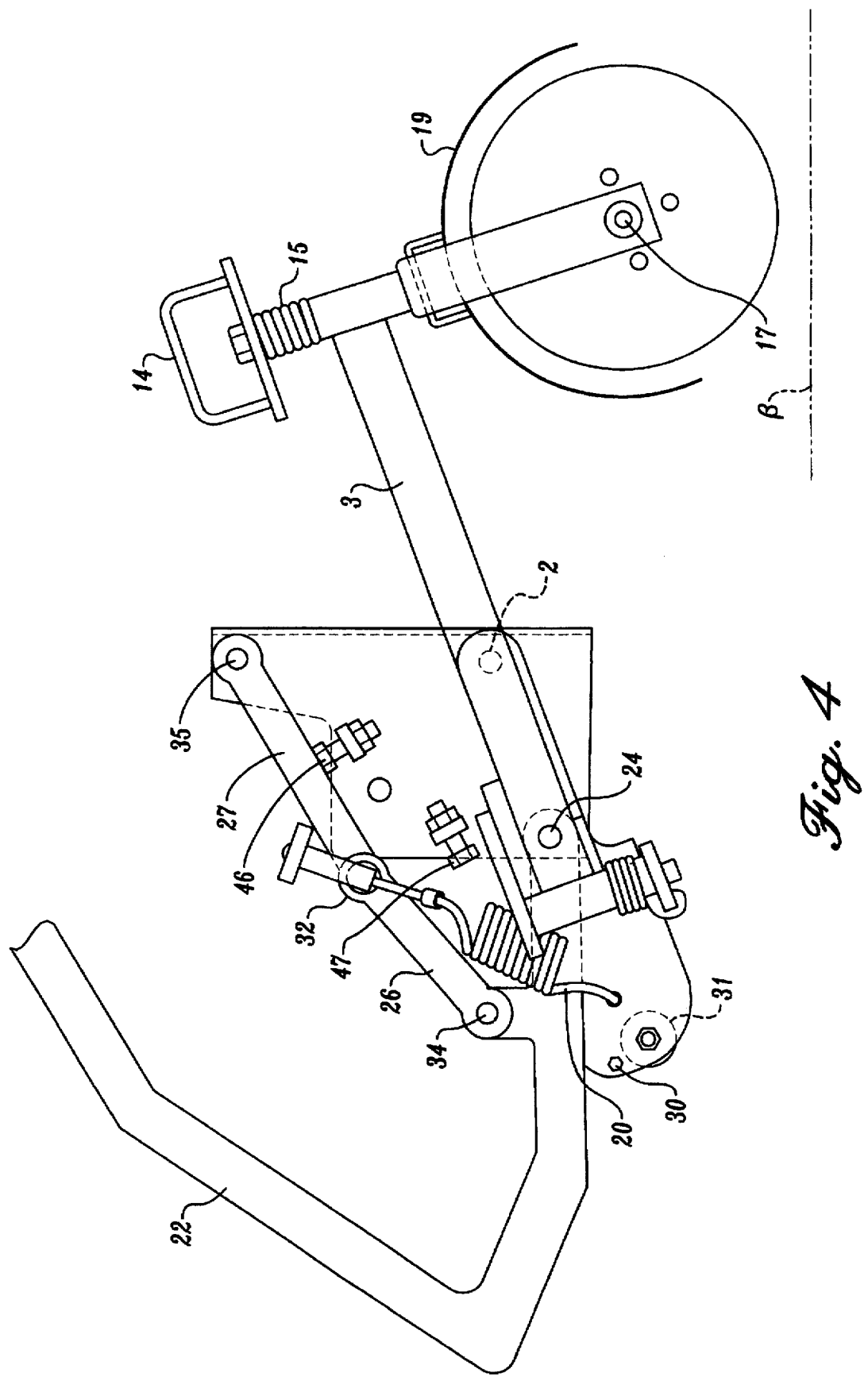
FIG. 4 shows a plan view of a portion of the apparatus of FIG. 3.

The tension spring 20 is connected to a connection member 25 which is itself connected to linkages 26 and 27. The provision of a connection member 25 which is movable during the displacement of the apparatus to and from its in use and out of use positions allows the tension spring 20 to be bought closer to its connection point 21 to the support arm in the initial stages of drawing the apparatus from its use towards its out of use position. Such motion releases the tension applied to the support arm 3 and thereby decreasing the bias on the cutting blade 5 towards the ground. FIG. 4 shows the mechanism in its out of use position and it can be seen that the tension spring 20 may be somewhat relieved in this out of use position. Furthermore, it can be seen that the actuating lever 22 can be provided with a bearing surface 30 to act upon a roller or other suitable bearing means 31 on the support arm 3 such that the rotation of the lever itself about its axis 24 brings the bearing surface 30 into contact with the bearing means 31 so as to assist in lifting the cutting blade to its out of use position while simultaneously reducing the bias towards the in use position applied by the tension spring 20.

In its most preferred form, the tension spring 20 may be retensioned as the mechanism approaches a fully out of use position although, due to the shift in the position of the connection member 25 supporting the tension spring 20, the tension supplied by the spring 20 in the second or out of use position may now be directed towards biasing the support arm 3 towards that out of use position.

Although any particular mechanism to shift the connection member 25 may be used, the linkage arms 26 and 27 being interconnected and supporting the connection member 25 at a common connection point 32 while being respectively connected to the main body 2 and actuating arm 22 allows a simple and efficient method of shifting the point of connection in direct response to rotation of the actuating arm 22 about its connection 24 to the main body portion 2. This can be seen with the connections of the linkage arm 26 to the actuating arm 22 at connection point 34 and the connection of the linkage arm 27 to the main body portion 2 at a pivotal connection 35.

The connection member 25 supporting the tensioning spring 20 may also be provided with an adjustment means such as the adjusting wheel 37 to allow adjustment to the point of connection between the tension spring 20 and the connecting member 25 in a line coaxial with the tension spring 20. This allows each piece of apparatus to be adjusted and the amount of bias placed on the support arm 3.

Figure 2:
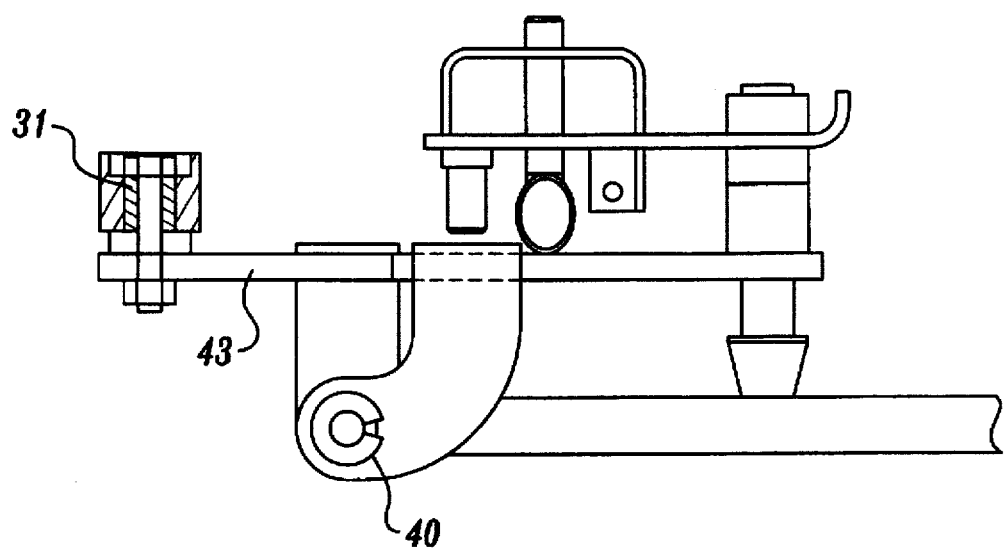
FIG. 2 shows a plan view of a portion of the apparatus of FIG. 1.

As can be seen in FIG. 1 and also in FIG. 2, the support arm 3 may also be mounted on a axle or pivot 40 substantially transverse to the pivotal axis 4 to the main body. This pivot 40 may include a biasing spring similar biasing means 41 to act on the support arm 3 in the horizontal direction. This biasing spring 41 preferably biases the cutting blade 5 towards the machine on which it is mounted while allowing the support arm 3 some freedom of movement so that a driver of a machine to which this apparatus is mounted does not need to maintain an exact distance from the interface between the border B and the grass area during use of the apparatus.

This may be provided by the support arm 3 having the pivot 40 provided at an end of the support arm 3 with a connection fixed against vertical rotation to intermediate member 43 which may carry the connection 21 to the tension spring 20, the bearing means 31 and the mounting for the pivotal mounting 4 of the support arm 3. This can be most clearly seen in FIG. 2.

Figure 3:
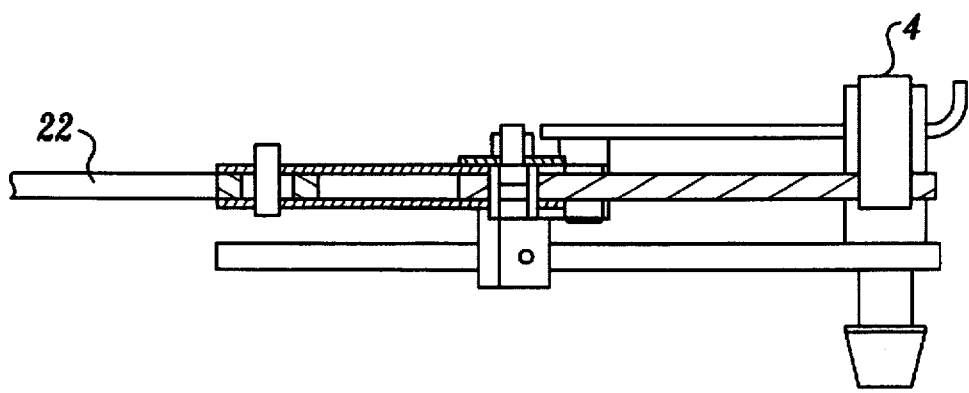
FIG. 3 shows an elevation view of the apparatus of FIG. 1 when in a second position.

FIG. 3 shows a plan view of the apparatus on a cross section aa as indicated in FIG. 1 when in the second position. It should be noted that not all components are shown in this cross section. FIG. 4 also shows the provision of two adjustable stops 46 and 47 which act upon components of the linkage or mechanism to set maximum points of travel of the mechanism for the in use or out of use positions. The stop 46 is particularly important in its stopping of the travel of linkage arm 27. Continued rotation of the actuating lever 22 beyond this point will cause the lever 22 to pivot about the pivot 24 and continue rotation of the linkage arm 26 about its pivotal connection 32 to the linkage arm 27. It is this continued rotation of the linkage arm 27 which will allow the actuating lever 22 to bear upon the roller 31 and retension the spring 20 towards its fully out of use position.

Both the stops 46 and 47 are provided by bolts or similar screw members which may be adjusted by rotation of the screw members to vary the limit of the travel.

Thus it can be seen that the apparatus provides a number of features not apparent in prior art apparatus of a similar nature.

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

We claim:

1. A grass cutting apparatus for the curing of grass against borders comprising:

a main body portion;

a support arm pivotably mounted to said main body portion;

a cutting blade connected to said support arm;

biasing means acting on said support arm for biasing said arm and for applying pressure to said arm when in an in-use position and for allowing vertical displacement of said support arm and cutting blade while in use; and a pivotally mounted lever connected by a linkage to said main body portion and operable to move said support arm between said in-use position and an out-of-use position, said biasing means also acting on said linkage to hold said support arm in both said in-use and said out-of-use positions.

2. A grass cutting apparatus as claimed in claim 1, wherein a single unidirectional rotation of said lever will move said support arm between said in-use and said out-of-use positions.

3. A grass cutting apparatus as claimed in claim 2, wherein said biasing means comprises a spring connected to said support arm on an opposite side of its pivotal mounting to its connection with said cutting blade.

4. A grass cutting apparatus as claimed in claim 3, wherein said support arm is provided with a further pivotal mounting substantially transverse to its pivotal mounting to said main body portion.

5. A grass cutting apparatus as claimed in claim 4, wherein a further biasing means is provided for said further pivotal mounting for biasing said support arm toward said main body portion when in said out-of-use position.

6. A grass cutting apparatus as claimed in claim 1, wherein said linkage comprises a pair of linkage arms pivotally connected together, said biasing means acting on said linkage at said pivotal connection between said linkage arms.

* * * * *

UNITED STATES PATENT AND TRADEMARK OFFICE
CERTIFICATE OF CORRECTION

PATENT NO. : 5,692,572
DATED : December 2, 1997
INVENTOR(S) : J.E. Cloney et al.

It is certified that error appears in the above-indentified patent and that said Letters Patent is hereby corrected as shown below:

COLUMN　　　LINE

5　　　26　　　"curing" should read --cutting--
(Claim 1,　line 1)

Signed and Sealed this

Fourth Day of August, 1998

Attest:

Attesting Officer

BRUCE LEHMAN

Commissioner of Patents and Trademarks